(12) United States Patent
May

(10) Patent No.: US 6,588,659 B2
(45) Date of Patent: Jul. 8, 2003

(54) CARD READER MODULE

(75) Inventor: David C. C. May, Fife (GB)

(73) Assignee: NCR Corporation, Dayton, OH (US)

( * ) Notice: Subject to any disclaimer, the term of this patent is extended or adjusted under 35 U.S.C. 154(b) by 33 days.

(21) Appl. No.: 09/826,611

(22) Filed: Apr. 5, 2001

(65) Prior Publication Data

US 2001/0038036 A1 Nov. 8, 2001

(30) Foreign Application Priority Data

May 4, 2000 (GB) ................................ 0010617

(51) Int. Cl.[7] ................................ G06K 5/00
(52) U.S. Cl. ............... 235/380; 235/453; 235/475; 235/483
(58) Field of Search ................. 235/375, 380, 235/381; 902/8, 30

(56) References Cited

U.S. PATENT DOCUMENTS

| | | | | |
|---|---|---|---|---|
| 3,909,595 A | * | 9/1975 | Morello et al. | 235/435 |
| 4,322,613 A | | 3/1982 | Oldenkamp | |
| 5,264,688 A | | 11/1993 | Matsuno et al. | |
| 5,317,137 A | | 5/1994 | Wilkins | |
| 5,768,143 A | * | 6/1998 | Fujimoto | 235/380 |
| 5,828,043 A | * | 10/1998 | Nicoll et al. | 235/380 |
| 5,850,079 A | * | 12/1998 | Ohwa et al. | 235/475 |
| 5,929,413 A | * | 7/1999 | Gardner | 235/381 |
| 6,045,377 A | | 4/2000 | Kajiura | |

FOREIGN PATENT DOCUMENTS

| | | |
|---|---|---|
| EP | 0236846 | 9/1987 |
| EP | 0363992 | 4/1990 |
| EP | 0784284 | 7/1997 |
| GB | 2293476 | 3/1996 |
| GB | 2299430 | 10/1996 |
| JP | 2001222686 A * | 8/2001 |

* cited by examiner

*Primary Examiner*—Michael G. Lee
*Assistant Examiner*—Ahshik Kim
(74) *Attorney, Agent, or Firm*—Francis L. Conte

(57) ABSTRACT

A card reader module (10) is described. The module (10) includes a trap mechanism (20) operable to trap a card (60) within the module (10) in response to the module (10) detecting a card (60) therein that cannot be transported. The trap mechanism (20) may be implemented by a width switch (22) and associated interlock (24), where the width switch (22) is located within a throat portion (14) of the card reader module (10). On detecting a jammed card, the width switch (22) is locked to prevent removal of the card. The module (10) may also include a magnetic head (28) operable to erase data stored on a magnetic stripe (62) on a card (60) if the trap mechanism (20) is not able to prevent removal of the card (60). A self-service terminal (70) for preventing fraud and a method of preventing fraud using the module (10) are also described.

17 Claims, 6 Drawing Sheets

CARD READER MODULE

BACKGROUND OF THE INVENTION

The present invention relates to a card reader module, particularly a motorized card reader module, for resisting fraud. The invention is particularly related to preventing fraud at a self-service terminal (SST), such as an ATM (automated teller machine), a point of sale (PoS) terminal, or any other terminal using a motorized card reader module.

ATMs typically store large amounts of cash. This makes them vulnerable to attack by thieves. To combat physical attack, ATMs include a safe for storing the cash. However, ATMs are also vulnerable to attack by fraud.

One type of fraud involves a third party placing a loop of thin, strong, material over a card entry slot in the ATM. The material is so thin that it may not be noticed by an unwary user of the ATM. The material is designed so that:

(1) it prevents a user's card from fully entering a motorized card reader module located behind the card entry slot, and (2) it prevents the entered user's card from being ejected from the motorized card reader module.

Thus, the design of this material causes an entered card to jam in the module so that the module cannot draw in or eject the card. When this happens, the user generally assumes that the ATM has gone out of service and goes away from the ATM, leaving his/her card jammed in the card reader module.

The third party can then extract the card from the card reader module, remove the thin material, and (if the third party has observed or otherwise obtained the user's PIN) use the card to withdraw cash from the ATM.

SUMMARY OF THE INVENTION

It is an object of an embodiment of the present invention to reduce the possibility of this type of fraud.

According to a first aspect of the invention there is provided a motorized card reader module characterized in that the module includes a trap mechanism operable to trap a card within the card reader module in response to the card reader module detecting a card within the module that cannot be transported.

By virtue of this aspect of the invention when a card is stuck within the module the module is able to trap the card therein, thereby preventing a third party or the authorized card holder from removing the card from the module. This safeguards the card without damaging it in any way.

The card reader module may be able to read data from and write data to a card (that is, it may be a card read/write module), or it may only be able to read data from a card.

Preferably, the trap mechanism is implemented by a width switch and an associated interlock, where the width switch is located within a throat portion of the card reader module and has an arm that is deflected by insertion of a card.

Conventional card reader modules use a width switch to ensure that a shutter within the module is only opened when a card of correct width is inserted, the width of the card being determined by deflection of the width switch. In a preferred embodiment, the width switch is locked in a non-deflected position when a card is to be trapped within the module. This has two advantages.

(i) any tampering with the switch (e.g. jamming it in the deflected position) to overcome this security measure will be evident to the card reader as the switch must move normally (from the open to the closed position) during a transaction (ii) a conventional card reader module only requires slight modification for use in the present invention.

By locking the width switch, the throat portion becomes too narrow for a card to be removed therethrough.

The trap mechanism may be activated using software and/or firmware and/or hardware control.

Preferably, the card reader module is operable, on detecting that the trap mechanism cannot trap an entered card, to activate a magnetic head located in a throat portion of the card reader module to erase data stored on a magnetic stripe on the entered card. This has the advantage that if the trap mechanism is unable to trap an entered card because part of the card is still in contact with the trap mechanism, then a magnetic head may be used to erase the data on the card so that the card is much less valuable to a fraudulent third party.

According to a second aspect of the present invention there is provided a self-service terminal comprising a fascia defining a card entry slot, and a card reader module located behind the card entry slot, characterized in that the module includes a trap mechanism operable to trap a card within the card reader module in response to the card reader module detecting a card within the module that cannot be transported.

The terminal may be an ATM.

According to a third aspect of the invention there is provided a motorized card reader module including a shutter and a width switch, characterized in that the width switch is operable to trap a card within the card reader module in response to the card reader module detecting a card within the module that cannot be transported.

The module may include a throat portion having a magnetic read/write head located so that only items of the correct width (as determined by the width switch) and having magnetic data (detected by the magnetic read/write head) are recognized as magnetic cards.

The module may be operable, on detecting that the width switch cannot trap a card within the module, to activate the read/write head to erase any data stored on a magnetic stripe in a card located in the vicinity of the width switch.

The module may activate an alarm on detecting a card within the module that cannot be transported. This alarm may be audible or visual, and may be relayed automatically to an appropriate person, for example to a person authorized to service the terminal.

The card reader module may use sensors to detect that a card cannot be transported (that is, having jammed). The event of a card having jammed may be indicated by any convenient technique. For example, where a first sensor detects the presence of a card and a second sensor does not detect the presence of the card a predetermined time after the first sensor detected the presence of the card. Another example is where a sensor continuously detects the presence of a card for a predetermined time interval. A further example is where a sensor detects the presence of a card for a predetermined time during attempted transportation of the card in a forward direction and the same sensor detects the presence of the card for a predetermined time during attempted transportation of the card in a reverse direction. Any one or any combination of these techniques may be used to detect that a card cannot be transported.

According to a fourth aspect of the present invention there is provided a method of preventing fraud, the method comprising the steps of: providing a trap mechanism for trapping a card within a card reader module; detecting entry of a card into the card reader module; monitoring transport of the card within the card reader module; and, in response to detection of a failure of the card reader module to transport the card correctly, activating the trap mechanism to trap the card.

The method may include the further step of displaying on a monitor a message informing the user about the capture of his/her card.

The method may include the steps of detecting continued activation of a first sensor but not detecting activation of a second sensor within a predetermined time. The first sensor may be a width sensor (width switch) for sensing the width of the card, and/or a magnetic stripe detecting sensor for detecting the correct orientation of a card. The magnetic stripe detecting sensor may be a magnetic read/write head.

The second sensor may be a read head sensor located in the vicinity of a magnetic card reading head within the card reader module.

The method may include the step of: on detecting that the trap mechanism is unable to trap the card, activating a read/write head for erasing any data stored on the card. The trap mechanism may be unable to trap the card if the card jams while maintaining the width switch in a deflected position.

According to a fifth aspect of the present invention there is provided a method of preventing fraud, the method comprising the steps of: providing a magnetic head for erasing data stored on a magnetic stripe carried by a card; detecting entry of a card into the card reader module; monitoring transport of the card within the card reader module; and, in response to detection of a failure of the card reader module to transport the card correctly, activating the magnetic head to erase any data stored on the stripe on the card.

According to a sixth aspect of the present invention there is provided a motorized card reader module characterized in that the module includes a magnetic head operable to erase data stored by a magnetic stripe on a card in response to the card reader module detecting a card within the module that cannot be transported.

Preferably, the magnetic head is located in a throat portion of the module.

The magnetic head may be an erase coil or a magnetic read/write head.

The module may erase data by passing an erase current through the magnetic head.

BRIEF DESCRIPTION OF THE DRAWINGS

These and other aspects of the invention will be apparent from the following specific description, given by way of example, with reference to the accompanying drawings, in which.

DETAILED DESCRIPTION

Figure 1:
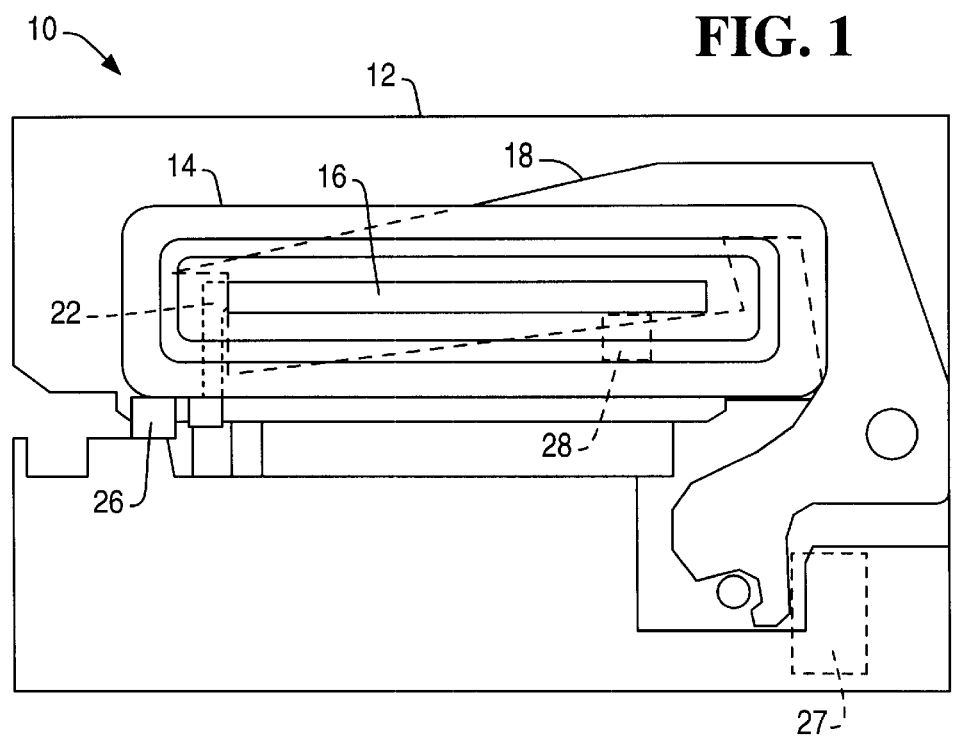
FIG. 1 is a schematic front view of a motorized card reader module according to an embodiment of the present invention.
Figure 2:
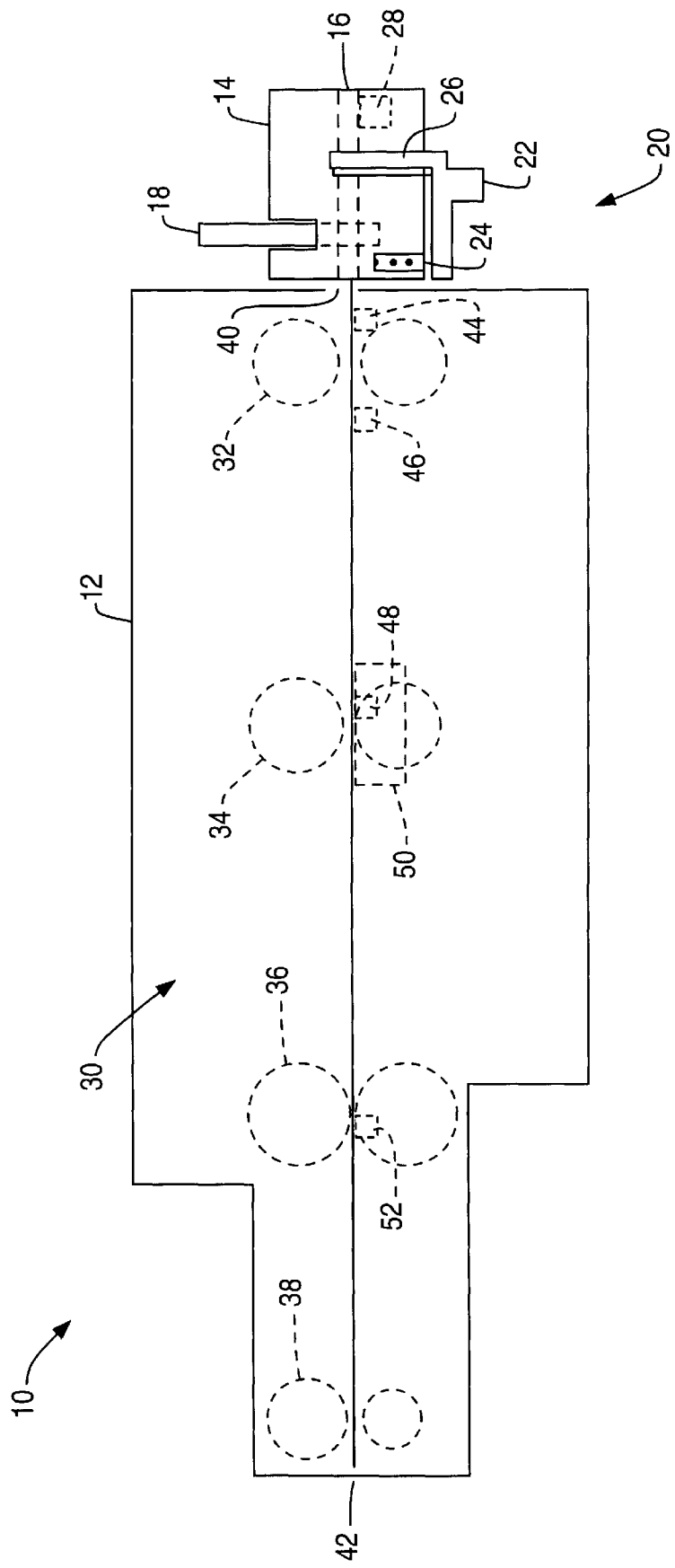
FIG. 2 is a schematic side view of the module of FIG. 1.

Reference is now made to FIGS. 1 and 2, which are front and side schematic views respectively of a motorized card reader/writer (MCRW) module 10.

The module 10 is a modified version of a conventional MCRW module made by Sankyo (trade mark) and available from Sankyo at 1-17-2, SHINBASHI, MINATO-KU, TOKYO, 1058633, Japan.

Module 10 comprises a housing 12 coupled to a throat portion 14 and is suitable for reading a standard size magnetic stripe card.

The throat portion 14 defines a slot 16 into which a magnetic stripe card may be inserted, and includes a shutter 18 pivotally coupled to the housing 12. With the shutter 18 in the open position, a card may be conveyed between the housing 12 and the throat portion 14; whereas, with the shutter 18 in the closed position no card may pass between the throat portion 14 and the housing 12. When the leading edge of a card passes the shutter 18, the shutter 18 is biased against the top of the card so that the shutter 18 automatically closes once the trailing edge of the card clears the shutter 18.

The throat portion 14 includes a trap mechanism 20 comprising a card width switch 22 and an interlock 24. The card width switch 22 has an elongated arm 26 that is pivotally mounted to the throat portion 14. The interlock 24 is in the form of a solenoid and pin arrangement, whereby when the pin protrudes from the solenoid it locks the switch 22 and prevents the arm 26 from pivoting.

The switch's arm 26 is deflected by a card on insertion and ejection of the card. Switch 22 detects when the arm 26 has been deflected by a card and when the arm 26 is in the undeflected position.

If a user inserts a conventional magnetic stripe card into the throat portion 14 then the arm 26 is deflected and switch 22 detects the deflection of the arm 26, which indicates the presence of the card.

The housing 12 includes a shutter detect sensor 27 for detecting whether the shutter 18 is in an open or closed position.

The throat portion 14 also includes a magnetic head in the form of a read/write head 28. Magnetic head 28 is used to detect that a magnetic stripe is present on a card being inserted. If no magnetic stripe is detected then the shutter 18 will not be opened, even if the arm 26 is deflected. Thus, shutter 18 will only be opened if a card is entered that has (1) the correct width (as detected by switch 22), and (2) a magnetic stripe in the correct location (as detected by read/write head 28).

Thus, if a magnetic stripe card is inserted in a wrong orientation the shutter 18 will not open.

Referring particularly to FIG. 2, the housing 12 also includes a linear transport mechanism, shown generally by arrow 30, comprising four pairs of rollers 32,34,36,38 and associated stretchable endless toothed belts (not shown) for transporting a card when it is within the housing 12.

The housing 12 defines an entrance/exit slot 40 at one end and a card retention/capture slot 42 at the opposite end. When a card is inserted by a user, the first pair of rollers 32 pinch the leading edge of the card and draw the card into the housing 12. When the trailing edge of the card clears the shutter 18, the shutter 18 closes thereby capturing the card within the housing 12, and the card reading operation begins.

The housing 12 includes four sensors for accurately locating the position of the card within the housing 12.

A card present sensor 44 is located in the vicinity of the throat portion 14 at the first pair of rollers 32. The sensor 44 is in the form of an optical sensor for detecting the presence of a card inserted into the housing 12.

A card eject sensor 46 is located a predetermined distance from the throat portion 14 to ensure that on ejection of a card the card protrudes from the throat portion 14 by a sufficient distance to allow a user to grip and remove the card.

A card detect sensor 48 is located at the second pair of rollers 34 in the vicinity of a card read/write head 50 so that when the leading edge of a card is detected, the magnetic stripe on the card may be read by the card read head 50.

A card stop sensor 52 is located distal from the throat portion 14 at the third pair of rollers 36. The card stop sensor 52 is spaced from the card read sensor 48 by a distance less than the length of a standard card, so that when the card stop sensor 52 detects the leading edge of a card, the card is still in contact with the card read sensor 48.

The card is only transported beyond the card stop sensor 52 if the card is to be conveyed out of the retention slot 42 and retained by the card reader module 10. Where the module 10 is used in an ATM, this may occur because a user has inserted the wrong PIN on a predetermined number of occasions, or because the card is registered as stolen.

The four sensors 44,46,48,52 are located so that once a card enters the housing 12 it can always be located by at least one of the sensors 44,46,48,52, unless the card is conveyed out of the retention slot 42.

Figure 3:
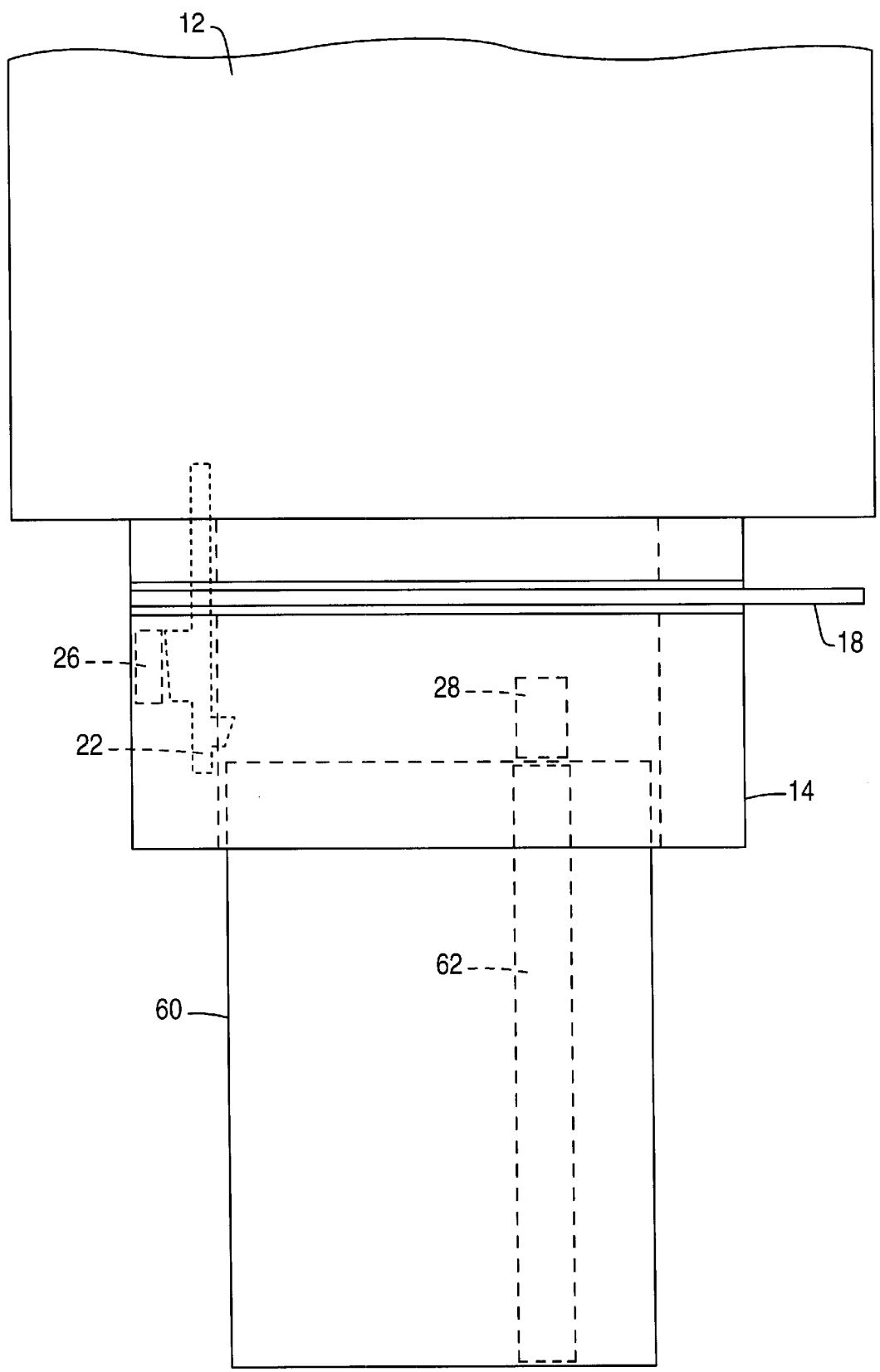
FIG. 3 is a schematic plan view of a card at a first position in the module of FIGS. 1 and 2.

FIG. 3 shows a card 60 having a magnetic stripe 62, the card being located at the entrance of the throat portion 14 of the module 10. In FIG. 3 the arm 26 is in the undeflected position and the shutter 18 is closed.

Figure 4:
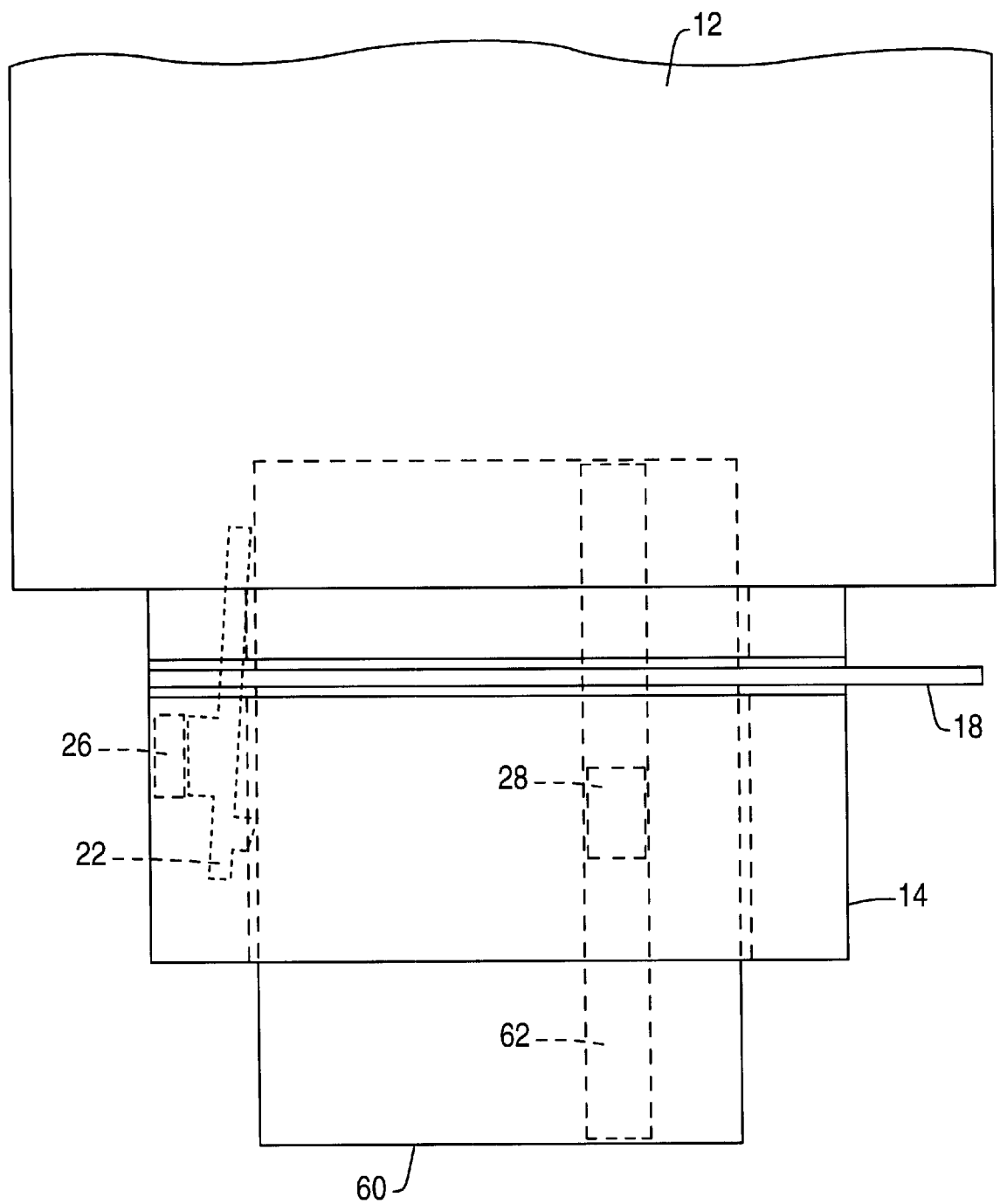
FIG. 4 is a schematic plan view of a card at a second position in the module of FIGS. 1 and 2.

FIG. 4 shows the card 60 partially within the housing 12. The shutter 18 is open and resting on the card 60, so sensor 27 detects the open shutter 18. The arm 26 is in the deflected position, so switch 22 detects the deflected arm 26. Read/write head 28 is in contact with the magnetic stripe 62, so head 28 detects magnetic data on the stripe 62.

Figure 5:
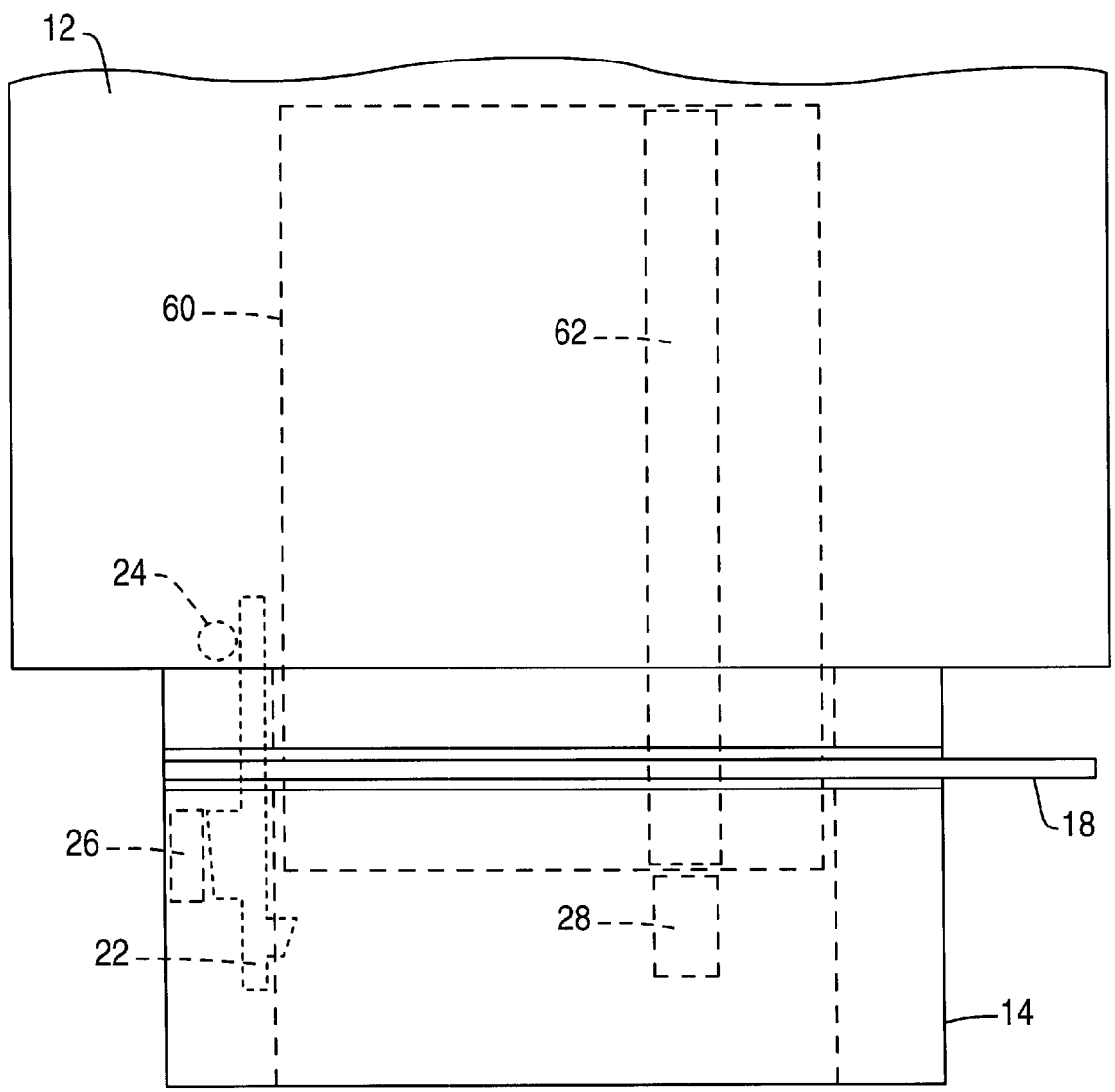
FIG. 5 is a schematic plan view of a card at a third position in the module of FIGS. 1 and 2.

FIG. 5 shows the card 60 having cleared switch 22. The card 60 has been jammed within the module 10 by a loop of material (not shown) so that the card cannot be transported by the module 10.

The shutter 18 is still open and resting on the card 60, so sensor 27 still detects the open shutter 18. The arm 26 has returned to the undeflected position, so switch 22 detects that the arm 26 is undeflected. Read/write head 28 is not in contact with the magnetic stripe 62, so head 28 does not detect magnetic data. As a large portion of the card 60 is inside the housing 12, sensor 44 and eject sensor 46 detect the presence of the card 60. However, the card 60 is not in contact with the card read sensor 48, so sensor 48 does not detect the card 60.

After a predetermined length of time between sensor 44 detecting the presence of a card and sensor 48 not detecting the card 60, for example ten seconds, the module 10 attempts to eject the card; however, the material (not shown) stops ejection of the card. Thus the module 10 can neither capture nor eject the card 60.

After another predetermined time during which the module 10 attempts to transport the card 60 (for example, 20 seconds) and in which sensor 44 continues detecting the presence of the card 60 but sensor 48 does not detect the presence of the card 60, the module 10 activates the interlock 24 to lock the arm 26 and prevent the card 60 from being removed.

Figure 6:
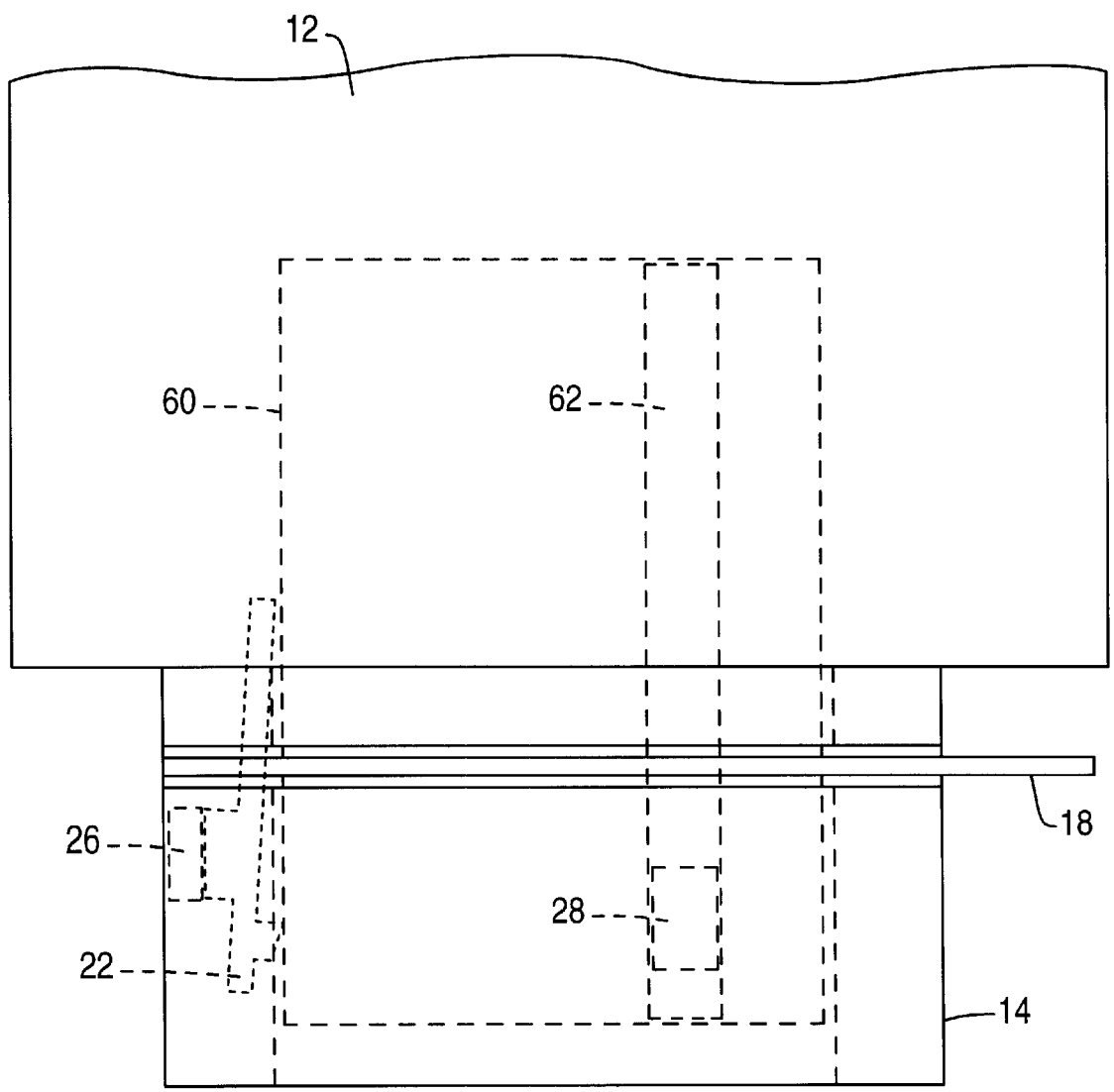
FIG. 6 is a schematic plan view of a card at a fourth position in the module of FIGS. 1 and 2.

FIG. 6 shows the card 60 still in contact with the arm 26. The card 60 has been jammed within the module 10 by a loop of material (not shown) so that the card 60 cannot be transported by the module 10. However, as the card 60 is still in contact with the arm 26, the interlock 24 cannot be activated. Thus, when the module 10 detects that the card 60 cannot be transported and that the interlock 24 cannot be activated, ATM software activates (sends an erase current to) the read/write head 28 to delete the data stored on the magnetic stripe 62. This ensures that if the card 60 is retrieved by a fraudulent third party, sufficient magnetic data has been erased so that card 60 cannot be used in motorized or swipe card reader modules. The read/write head 28 may be activated (continuously or intermittently) until the card 60 is removed so that most of (or all) the data on the magnetic stripe 62 is erased when the card 60 is removed from the module 10.

Figure 7:
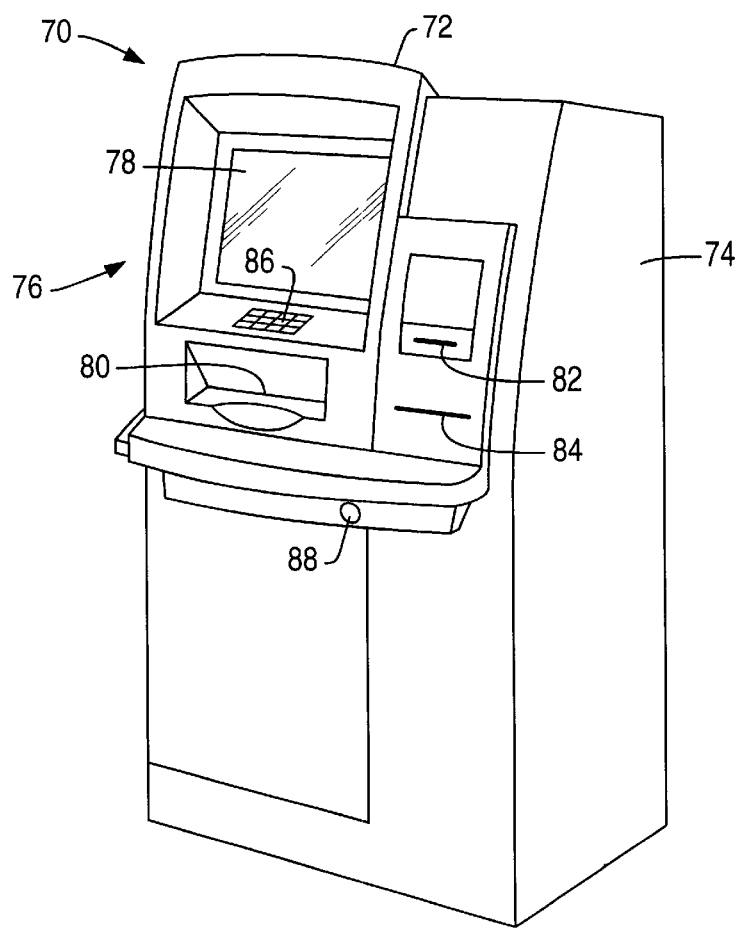
FIG. 7 is a perspective view of a self-service terminal according to another embodiment of the present invention.

FIG. 7 is a perspective view of an SST 70, in the form of an ATM, including the module of FIGS. 1 to 6. The ATM 70 comprises a chassis (not shown) for supporting a fascia 72, exterior panels 74 and internal ATM modules (not shown). The fascia 72 incorporates a user interface 76. The fascia 72 defines a plurality of slots so that when the fascia 72 engages filly with the chassis and panels 74 the slots align with user interface elements located within the ATM 70.

The user interface 76 comprises a display 78, a cash dispense slot 80, a card entry/exit slot 82 (herein referred to as a card entry slot), a receipt slot 84, and an encrypting keypad 86.

The fascia 72 has a lock mechanism 88 for securing the fascia 72 to and for releasing the fascia 72 from the chassis and panels 74.

Referring to FIGS. 1 to 7, in the event of a fraudulent third party placing a length of thin, strong, material (not shown) over the ATM card entry slot 82, the operation of the ATM 70 would be as follows.

An unwary user may approach the ATM 70 and insert his card into ATM card entry slot 82. The card enters throat slot 16; deflects arm 26, thereby opening the shutter 18; enters the housing 12; is pinched by first rollers 32; and is drawn into housing 12. However, as the card is being drawn into housing 12 the material (not shown) stops the card from filly entering the housing 12. At this position part of the card is still underneath the shutter 18 so that the shutter 18 cannot close. Sensor 44 detects the presence of the card, but sensor 48 does not detect the presence of a card. After a predetermined length of time, for example ten seconds, the module 10 attempts to eject the card; however, the material (not shown) stops ejection of the card. Thus the module 10 can neither draw in nor eject the card.

After another predetermined time (for example, 20 seconds) during which the module 10 attempts to eject the card, if sensor 44 continues to detect the presence of a card but sensor 48 does not detect the presence of a card, the module 10 then determines via switch 22 whether the arm 26 is deflected or undeflected.

(1) If the arm 26 is undeflected then the module 10 activates the interlock 24 to prevent removal of the card.

(2) If the arm 26 is deflected then the module 10 activates the read/write head 28 to erase any magnetic data stored on the magnetic stripe on the card.

In the event of condition (1) above, the ATM 70 displays a message on the display 78 informing the user that the card has been retained.

In the event of condition (2) above, the ATM 70 displays a message on the display 78 informing the user that the card is not usable.

The display may also provide details of how the user may apply for the card back or for a new card.

The ATM 10 then informs a service center that it is out of operation due to possible fraud. A service engineer is then called to remove the material and the card (if still present) so that the ATM 70 is restored to working order. To remove the card, the service engineer lifts the fascia 72 and resets the interlock 24 on the module 10. The engineer can then remove the material and the card in a similar way to the third party.

Various modifications may be made to the above described embodiment within the scope of the invention, for example, the interlock may be implemented in a number of different ways. The predetermined time periods, such as when one sensor detects a card but another sensor does not detect a card may be longer or shorter than 20 seconds. Any convenient combination of the sensors 26,27,28,44,46,48 may be used (for example sensor 27 and sensor 48; or, sensor 44 and sensor 48) to detect that a card has jammed within the housing 12. The self-service terminal may be a non-cash kiosk. In other embodiments, different MCRW modules than that described may be used, for example, an MCRW module from Omron.

What is claimed is:

1. A motorized card reader module comprising:
   means for detecting a card which is unable to be transported; and
   a trap mechanism including a pivotable switch arm used to measure width of the card, and means for locking the switch arm for trapping the card within the card reader module when the card is unable to be transported.

2. A module according to claim 1, further comprising means defining a throat portion, and wherein the trap mechanism includes a width switch located in the throat portion, with the width switch including the switch arm.

3. A module according to claim 2, further comprising (i) means for detecting that the trap mechanism is unable to trap an entered card, and (ii) means for activating a magnetic head located in the throat portion to erase data stored on a magnetic stripe on the entered card when the trap mechanism is unable to trap the entered card.

4. A self-service terminal comprising:
   a fascia defining a card entry slot; and
   a card reader module located behind the card entry slot and including (i) means for detecting a card which is unable to be transported, and (ii) a trap mechanism including a pivotable switch arm used to measure width of the card, and means for locking the switch arm for trapping the card within the card reader module in response to detection of the card being unable be transported.

5. A motorized card reader module comprising:
   a shutter;
   means for detecting a card which is unable to be transported while said shutter is open;
   a width switch having a pivotable arm; and
   means for locking the switch arm to trap the card within the card reader module when the card is unable to be transported.

6. A module according to claim 5, further comprising means for activating an alarm when a card within the module is unable to be transported.

7. A method of preventing fraud, the method comprising the steps of:
   detecting entry of a card into a card reader module;
   measuring width of the card using a width switch having a pivotable switch arm;
   monitoring transport of the card within the card reader module; and
   activating a trap mechanism to lock the switch arm and trap the card within the card reader module in response to detection of a failure of the card reader module to transport the card correctly.

8. A method according to claim 7, further comprising the step of displaying on a monitor a message to inform a user about capture of the card.

9. A method according to claim 7, further comprising the steps of detecting continued activation of a first sensor, and detecting non-activation of a second sensor within a predetermined time.

10. A method according to claim 7, further comprising the step of activating a read/write head for erasing data stored on a card when the trap mechanism is unable to trap the card.

11. An automated teller machine (ATM) comprising:
    a cash dispenser for dispensing cash to an ATM customer;
    a fascia defining an ATM card entry slot; and
    an ATM card reader module located behind the ATM card entry slot and including (i) means for detecting an ATM card which is unable to be transported, and (ii) a trap mechanism including a pivotable switch arm used to measure width of the card, and means for locking the switch arm for trapping the ATM card within the ATM card reader module in response to detection of the ATM card being unable be transported.

12. A motorized card reader module comprising:
    a throat including a slot for receiving a magnetic stripe card;
    a shutter operatively joined at the throat for controlling access through the slot by the card;
    a switch having an arm pivotally mounted to the throat adjacent the slot for being deflected by insertion of the card through the slot;
    means for detecting jamming of the card inside the slot while the shutter is open; and
    means for locking the switch arm in response to detection of card jamming to trap the card inside the slot.

13. A module according to claim 12, further comprising means for activating an alarm when the card within the module is jammed.

14. A module according to claim 12 wherein the locking means are configured to lock the switch arm after the card clears the switch arm for narrowing the slot to prevent removal of the card.

15. A module according to claim 14 wherein the locking means comprise an interlock for preventing pivoting of the switch arm.

16. A module according to claim 14 wherein the locking means comprise a solenoid having a protruding pin for locking the switch arm.

17. A module according to claim 14 further comprising means for erasing the magnetic stripe card in response to jamming of the card, and when the card has not cleared the switch arm.

* * * * *